United States Patent
Yokoyama et al.

(10) Patent No.: US 8,902,465 B2
(45) Date of Patent: Dec. 2, 2014

(54) IMAGE FORMING APPARATUS, IMAGE PROCESSING APPARATUS AND METHOD CAPABLE OF DETERMINING IMAGE FORMING CONDITION WHEN COLOR UNEVENNESS CAUSED IN PATCH IMAGE IS DETECTED

(75) Inventors: Ken Yokoyama, Suntou-gun (JP); Akihito Sonoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 13/302,263

(22) Filed: Nov. 22, 2011

(65) Prior Publication Data
US 2012/0154832 A1 Jun. 21, 2012

(30) Foreign Application Priority Data
Dec. 15, 2010 (JP) ................................. 2010-279858

(51) Int. Cl.
| | | |
|---|---|---|
| G06K 1/00 | (2006.01) | |
| H04N 1/60 | (2006.01) | |
| G03G 15/00 | (2006.01) | |
| G06K 9/62 | (2006.01) | |
| G09G 5/02 | (2006.01) | |
| B41J 2/385 | (2006.01) | |

(52) U.S. Cl.
CPC .................................. *H04N 1/6033* (2013.01)
USPC ............. 358/1.9; 358/2.1; 358/3.01; 358/3.1; 358/518; 399/49; 399/112; 382/165; 382/167; 345/589; 345/690; 347/115; 347/172; 347/232

(58) Field of Classification Search
None
See application file for complete search history.

(56) References Cited

U.S. PATENT DOCUMENTS

| | | | | |
|---|---|---|---|---|
| 5,612,793 | A * | 3/1997 | Ito et al. ......................... | 358/500 |
| 6,072,596 | A * | 6/2000 | Hattori et al. ................... | 358/401 |
| 6,975,338 | B2 * | 12/2005 | Hirai et al. ..................... | 347/133 |
| 7,327,962 | B2 * | 2/2008 | Shoji et al. ....................... | 399/9 |
| 7,522,766 | B2 * | 4/2009 | Ishidera ......................... | 382/165 |
| 7,903,269 | B2 * | 3/2011 | Nakagawa et al. .......... | 358/1.14 |
| 7,990,589 | B2 * | 8/2011 | Otake et al. ................... | 358/518 |

FOREIGN PATENT DOCUMENTS

| | | |
|---|---|---|
| JP | 2002-055498 A | 2/2002 |
| JP | 2006-174182 A | 6/2006 |
| JP | 2006-259142 A | 9/2006 |

* cited by examiner

*Primary Examiner* — Steven Kau
(74) *Attorney, Agent, or Firm* — Fitzpatrick, Cella, Harper & Scinto

(57) ABSTRACT

The present invention provides a mechanism that more appropriately evaluates an image defect caused by a specific process in an image forming apparatus. An image forming apparatus of this invention performs colorimetry of a patch image at a spatial resolution corresponding to the spatial frequency of color unevenness caused by a specific process included in an image forming process. A statistic value based on the n-th (n is an integer of 2 or more) order central moment of a specific color component of a colorimetric value obtained by performing colorimetry at the spatial resolution is compared with a reference value, thereby detecting that the color unevenness caused by the specific process has occurred in the patch image.

8 Claims, 13 Drawing Sheets

FIG. 6

| Sample No. | COLOR UNEVENNESS CAUSED BY FIXING (701) | | COLOR UNEVENNESS CAUSED BY TRANSFER (702) | |
|---|---|---|---|---|
| | OBJECTIVE EVALUATION VALUE | SUBJECTIVE EVALUATION VALUE | OBJECTIVE EVALUATION VALUE | SUBJECTIVE EVALUATION VALUE |
| 1 | 6.6 | 26.6 | 14.2 | 59.4 |
| 2 | 12.0 | 81.6 | 15.5 | 49.2 |
| 3 | 10.6 | 53.5 | 13.3 | 40.6 |
| 4 | | | 16.8 | 69.1 |
| 5 | | | 20.6 | 90.3 |
| 6 | | | 21.7 | 91.5 |
| 7 | | | 12.0 | 42.8 |
| 8 | 12.6 | 100.0 | 14.5 | 39.0 |
| 9 | | | 6.9 | 2.0 |
| 10 | 9.1 | 62.6 | 10.3 | 1.7 |
| 11 | 6.1 | 33.0 | | |
| 12 | 7.1 | 43.2 | | |
| 13 | 3.6 | 0.0 | 7.0 | 0.0 |
| 14 | 10.9 | 76.5 | 11.6 | 10.1 |
| 15 | 11.0 | 69.4 | 11.3 | 8.8 |
| 16 | 9.3 | 52.1 | 10.7 | 8.7 |
| 17 | 8.7 | 53.5 | 11.0 | 31.4 |
| 18 | 7.4 | 36.8 | | |
| 19 | 5.7 | 10.3 | | |

| CORRELATION COEFFICIENT | 0.96 | 0.94 |
|---|---|---|

FIG. 7
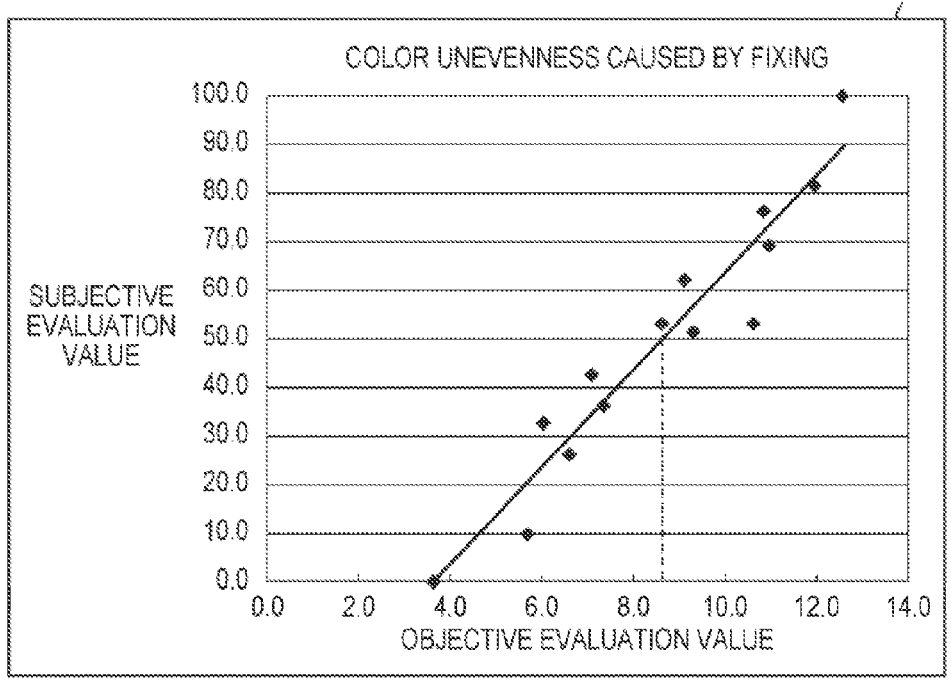
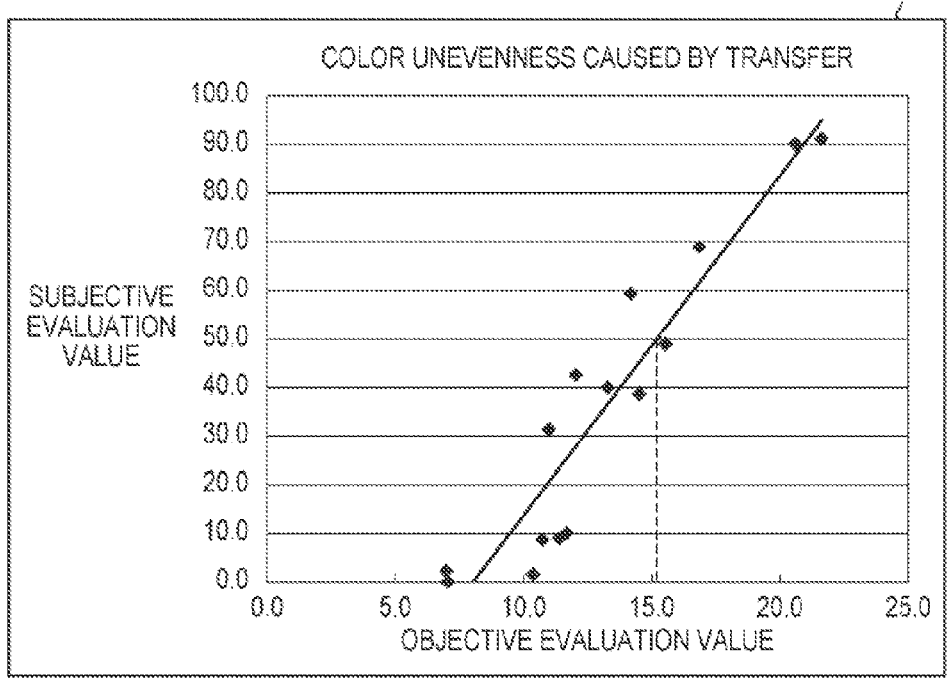

IMAGE FORMING APPARATUS, IMAGE PROCESSING APPARATUS AND METHOD CAPABLE OF DETERMINING IMAGE FORMING CONDITION WHEN COLOR UNEVENNESS CAUSED IN PATCH IMAGE IS DETECTED

BACKGROUND OF THE INVENTION

1. Field of the Invention

The present invention relates to an image forming apparatus, an image processing apparatus, an image processing method, and a recording medium.

2. Description of the Related Art

An electrophotographic color image forming apparatus such as a copying machine, an MFP, or a printer generally performs color correction processing based on density control using a predetermined test chart (patch images). In the color correction processing, for example, patch images for density detection are formed on a photosensitive member, an intermediate transfer member, or a transfer material carrier that carries the transfer material, and the densities of the patch images are detected using a density detection sensor. In addition, an image forming condition such as a charging bias, a developing bias, or an exposure amount in the image forming process is corrected in accordance with the detected density, thereby performing color correction.

In such color correction processing, the color correction is generally done for each color by forming patch images of the respective colors. However, it may be impossible to appropriately cope with an image density variation caused when developing materials (toners) of a plurality of colors are superposed. For example, when a toner image is formed by superposing a plurality of color toners, a toner layer thicker than that of a toner image of a single color toner is formed. This may lead to a transfer error that changes the appropriate transfer voltage and degrades the toner image transfer performance.

For example, assume that a magenta (M) toner layer is formed on the surface of the intermediate transfer member, and a cyan (C) toner layer is superposed on it to form a multicolor toner image. When transferring the toner image from the intermediate transfer member to a recording material, the C toner layer is directly transferred onto the recording material, and the M toner layer is transferred on it. At this time, a transfer error may occur so that only part of the M toner layer that is farther from the recording material surface than the C toner layer is transferred to the recording material, and the other part remains on the intermediate transfer member due to shortage of the transfer voltage or the like. If such a transfer error occurs, the color obtained by mixing the plurality of toners superposed and transferred to the recording material becomes too close to the color (C, in this case) of the toner layer at a shorter distance from the sheet surface, resulting in degradation of multicolor reproducibility of the formed image.

To cope with the above-described degradation of multicolor reproducibility caused by the transfer error, Japanese Patent Laid-Open No. 2006-259142 proposes a method of printing a test chart including a patch image of a multicolor expressed by overlaying color toners and performing color correction based on the colorimetric result of the printed test chart. This method allows to detect a process failure that causes degradation of color reproducibility of a high-density multicolor.

An image defect such as the above-described degradation of color reproducibility or color unevenness caused when forming a patch image can occur not only in the transfer processing but also in fixing processing of fixing the transferred toner image onto a sheet. In general, the surface of plain paper is uneven with a step of several μm. When fixing a toner image transferred to such plain paper, the thickness of the fixed toner layer may change between regions of the plain paper surface depending on the fixing temperature. More specifically, when the fixing temperature or the pressure in the fixing processing is high, the molten toner is pressed from the convex portions into the concave portions of the plain paper surface, resulting in an uneven toner layer thickness. The color is developed to high saturation at the concave portions where the toner layer is thick and to low saturation at the convex portions where the toner layer is thin. The color of the formed patch image is developed to low saturation especially because of the thin toner layer portions. In addition, the saturation unevenness occurs as color unevenness for each small region of the patch image in accordance with the unevenness of the sheet.

To reduce the above-described color unevenness caused upon transfer or fixing by color correction processing so as to suppress an image defect, it is necessary to quantitatively evaluate the image defect. Methods of quantitatively evaluating an image defect are proposed in, for example, Japanese Patent Laid-Open Nos. 2006-259142 and 2006-174182. In the method proposed in Japanese Patent Laid-Open No. 2006-259142, a transfer error or a fixing error is detected based on the difference between a predetermined target value and a colorimetric value obtained by performing colorimetry of a multicolor patch image, as described above, and the process conditions of the image forming apparatus are adjusted based on the detection result. In the method proposed in Japanese Patent Laid-Open No. 2006-174182, color unevenness is quantitatively evaluated based on the maximum value of the color difference concerning a color value obtained by reading an evaluation pattern output from the image forming apparatus as image data.

However, as an important factor that can affect subjective evaluation of an image including color unevenness, the spatial frequency characteristic of color unevenness is known. For this reason, to objectively and accurately evaluate color unevenness, the spatial frequency of the color unevenness needs to be taken into consideration. In Japanese Patent Laid-Open No. 2006-174182, however, since the image quality is quantified without considering the spatial frequency of color unevenness, it is difficult to objectively and accurately evaluate an image defect caused by color unevenness.

Furthermore, in a patch image formed for color correction, the amount of applied toner may change depending on the performance difference generated at the time of manufacture of the image forming apparatus main body or its consumables, or the life, use environment, printing environment, or printing condition of the image forming apparatus main body or its consumables. For this reason, even if no color unevenness is caused by transfer or fixing, the color of the patch image is not always constant. Hence, when detecting an image defect based on the difference between the colorimetric value and the target value of the patch image, as in Japanese Patent Laid-Open No. 2006-259142, it is difficult to determine what leads to the detection result, color unevenness caused by transfer or fixing or the variation in the amount of applied toner caused by the change of the printing environment or the like.

SUMMARY OF THE INVENTION

The present invention solves at least one of the above-described and other problems. The present invention provides a mechanism for more appropriately evaluating an image defect caused by a specific process.

According to one aspect of the present invention, there is provided an image forming apparatus comprising: an image forming unit that forms, on a recording material, a patch image to be used to detect color unevenness by executing an image forming process including a plurality of processes; a colorimetry unit that performs colorimetry of the patch image formed on the recording material at a spatial resolution corresponding to a spatial frequency of color unevenness caused by a specific process included in the image forming process, thereby obtaining a colorimetric value; a detection unit that detects that the color unevenness caused by the specific process has occurred in the patch image by comparing a statistic value based on an n-th (n is an integer not less than 2) order central moment of a specific color component of the colorimetric value obtained by the colorimetry unit with a reference value; and an adjustment unit that, when the detection unit detects that the color unevenness caused by the specific process has occurred in the patch image, adjusts an image forming condition concerning the specific process so as to reduce the color unevenness.

According to another aspect of the present invention, there is provided an image processing apparatus for detecting color unevenness caused in an image formed on a recording material by an image forming apparatus that executes an image forming process including a plurality of processes, comprising: a reading unit that reads a recording material on which a patch image to be used to detect color unevenness is formed by the image forming apparatus; a colorimetry unit that obtains, from image data read by the reading unit, a colorimetric value upon performing colorimetry of the patch image at a spatial resolution corresponding to a spatial frequency of color unevenness caused by a specific process included in the image forming process; and a detection unit that detects that the color unevenness caused by the specific process has occurred in the patch image by comparing a statistic value based on an n-th (n is an integer not less than 2) order central moment of a specific color component of the colorimetric value obtained by the colorimetry unit with a reference value.

According to still another aspect of the present invention, there is provided an image processing method of detecting color unevenness caused in an image formed on a recording material by an image forming apparatus that executes an image forming process including a plurality of processes, comprising: reading a recording material on which a patch image to be used to detect color unevenness is formed by the image forming apparatus; obtaining, from image data read in the reading, a colorimetric value upon performing colorimetry of the patch image at a spatial resolution corresponding to a spatial frequency of color unevenness caused by a specific process included in the image forming process; and detecting that the color unevenness caused by the specific process has occurred in the patch image by comparing a statistic value based on an n-th (n is an integer not less than 2) order central moment of a specific color component of the colorimetric value obtained in the obtaining the colorimetric value with a reference value.

According to the present invention, it is possible to provide, for example, a mechanism for more appropriately evaluating an image defect caused by a specific process.

Further features of the present invention will become apparent from the following description of exemplary embodiments (with reference to the attached drawings).

BRIEF DESCRIPTION OF THE DRAWINGS

FIG. 6 is a table showing the relationship between the subjective evaluation value and the objective evaluation value of a patch image in the image forming apparatus according to the first embodiment;

FIG. 7 shows graphs that plot the evaluation values in FIG. 6;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment of the present invention will now be described. In this embodiment, as an example of an image forming apparatus according to the present invention, an electrophotographic color image forming apparatus to which the present invention is applied will be explained.

<Overall Arrangement of Image Forming Apparatus>

The arrangement of an image forming apparatus 10 will be described first with reference to FIG. 1, and the operation of an image forming unit that executes an image forming process will also be described. The image forming apparatus 10 includes a plurality of image forming stations corresponding to four developing colors: yellow (Y), magenta (M), cyan (C), and black (K), respectively. The image forming stations include photosensitive drums (image carriers) 22Y, 22M, 22C, and 22K that carry developing material images (toner images) formed using developing materials (toners) of the respective colors, and charging rollers 23Y, 23M, 23C, and 23K that charge the photosensitive drums, respectively. The photosensitive drums 22Y, 22M, 22C, and 22K charged by the charging rollers 23Y, 23M, 23C, and 23K are exposed by scanner units 24Y, 24M, 24C, and 24K, respectively. The scanner units 24Y, 24M, 24C, and 24K expose the surfaces of the photosensitive drums 22Y, 22M, 22C, and 22K to exposure light in accordance with an input image data signal, thereby forming electrostatic latent images on their surfaces, respectively.

The image forming stations further include developing units 26Y, 26M, 26C, and 26K that perform development using Y, M, C, and K toners, respectively, and toner cartridges 25Y, 25M, 25C, and 25K that supply the toners to the developing units, respectively. The developing units 26Y, 26M, 26C, and 26K include sleeves 26YS, 26MS, 26CS, and 26KS, respectively. The image forming apparatus 10 applies developing biases to the sleeves 26YS, 26MS, 26CS, and 26KS to develop the electrostatic latent images on the photosensitive drums 22Y, 22M, 22C, and 22K by the toners, thereby forming toner images on the photosensitive drums, respectively. The toner images after the development are primary-transferred sequentially from the photosensitive drums 22Y, 22M, 22C, and 22K to an intermediate transfer member 27 while being overlaid. After that, cleaning units 35Y, 35M, 35C, and 35K provided near the photosensitive drums 22Y, 22M, 22C, and 22K collect the toners remaining on the photosensitive drums 22Y, 22M, 22C, and 22K into containers, thereby cleaning the photosensitive drum surfaces.

Figure 1:
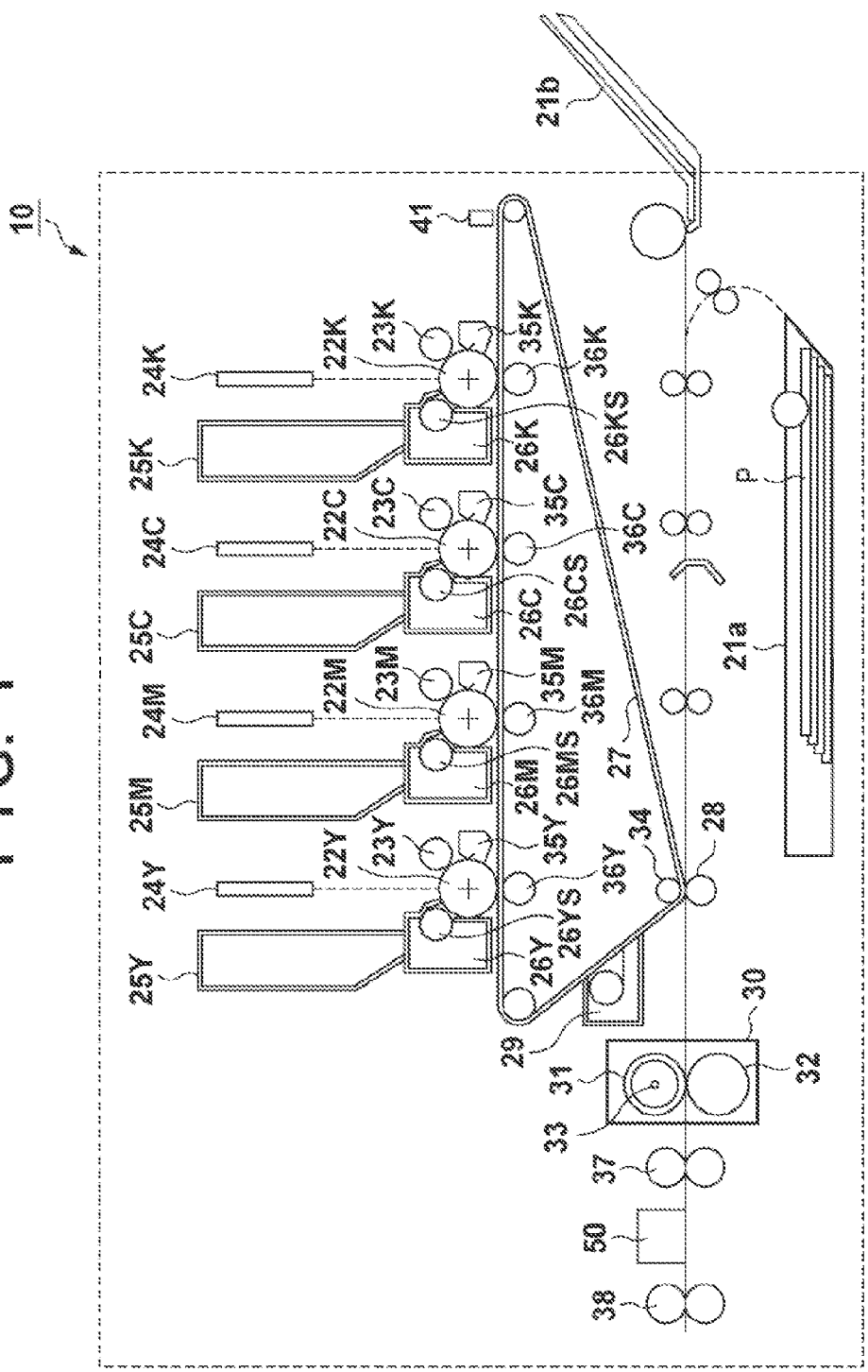
FIG. 1 is a schematic view showing the arrangement of an image forming apparatus according to the first embodiment.

At the time of image formation (printing), the intermediate transfer member 27 rotates clockwise in FIG. 1 in accordance with rotation of the photosensitive drums 22Y, 22M, 22C, and 22K while being in contact with them. When transfer biases are applied to primary transfer rollers 36Y, 36M, 36C, and 36K, the color toner images on the photosensitive drums 22Y, 22M, 22C, and 22K are transferred to the intermediate transfer member 27. At this time, the color toner images on the photosensitive drums 22Y, 22M, 22C, and 22K are transferred to the intermediate transfer member 27 while being superposed so that a multicolor toner image is formed on the intermediate transfer member 27. The toner image is conveyed toward the secondary transfer position between a secondary transfer roller 28 and an opposite roller 34 as the intermediate transfer member 27 rotates.

In the image forming apparatus 10, a recording material (sheet) P fed from a paper feed cassette 21a or a paper feed tray 21b for manual feed is conveyed to the secondary transfer position in accordance with the timing of the above-described toner image formation processing. At the secondary transfer position, the toner image on the intermediate transfer member 27 is secondary-transferred to the sheet P conveyed while being sandwiched between the secondary transfer roller 28 and the opposite roller 34. A cleaning unit 29 collects the toners remaining on the intermediate transfer member 27 into the container, thereby cleaning the surface of the intermediate transfer member 27.

The sheet P after the secondary transfer is conveyed to a fixing unit 30. As shown in FIG. 1, the fixing unit 30 includes a fixing roller 31 that heats the sheet P, and a pressurizing roller 32 that presses the sheet P against the fixing roller 31. The fixing roller 31 is hollow and incorporates a heater 33. In the fixing unit 30, the fixing roller 31 and the pressurizing roller 32 convey the sheet P while applying heat and pressure. The color toner image on the sheet P is thus fixed to its surface. The sheet P after the fixing processing is conveyed by conveyance roller pairs 37 and 38 and discharge rollers (not shown) and finally discharged to a discharge tray (not shown) provided outside the apparatus.

(Arrangement of Color Sensor 50)

Figure 2:
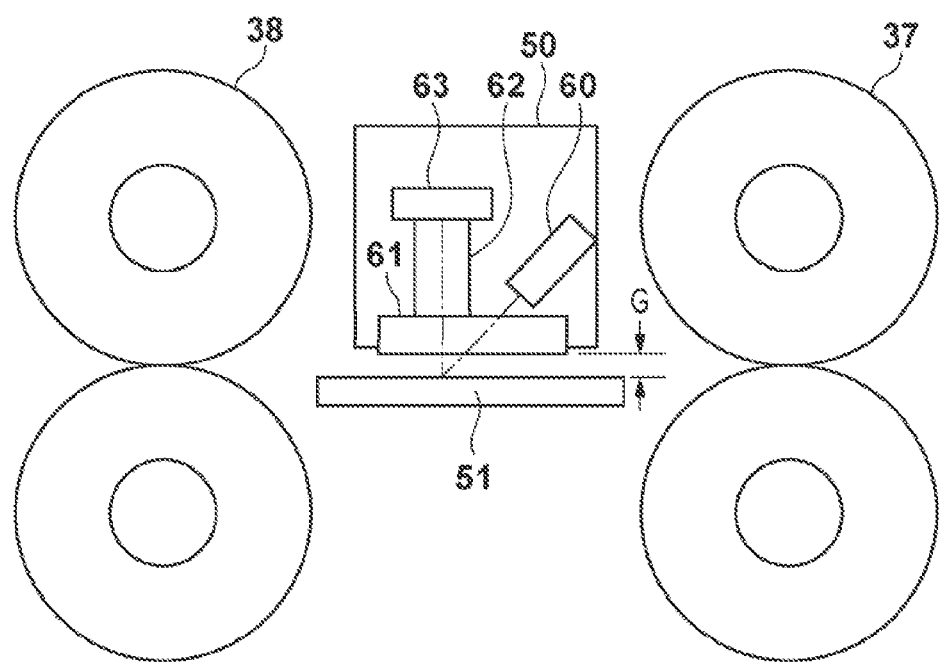
FIG. 2 is a sectional view of a color sensor 50 and conveyance roller pairs 37 and 38 according to the first embodiment.

In this embodiment, the image forming apparatus 10 includes a color sensor 50 in the region between the conveyance roller pairs 37 and 38 downstream of the fixing unit 30 on the conveyance path of the sheet P. The color sensor 50 is used to read a color correction patch image formed on the sheet P and, in this embodiment, functions as an image information input unit (a colorimetric unit that obtains the colorimetric value of a patch image by performing colorimetry of it). The arrangement of the color sensor 50 will briefly be described below with reference to the sectional view of FIG. 2. As shown in FIG. 2, the color sensor 50 forms a gap G to convey the sheet P with respect to an opposite plate 51. When the sheet P discharged from the fixing unit 30 passes through the gap G on the conveyance path, the color sensor 50 detects the toner image on the sheet P. The color sensor 50 incorporates a white LED 60 that illuminates the surface of the sheet P, a contact glass 61 that protects the interior of the color sensor 50 from friction, paper dust, and the like, a SELFOC® glass 62 that guides the light reflected by the sheet P, and a sensor 63 that detects the reflected light. Note that the color sensor 50 performs colorimetry of the fixed patch image on the sheet P that is sandwiched by the conveyance roller pairs 37 and 38 to suppress fluttering.

In this embodiment, the sensor 63 is a color CCD line sensor formed from three lines corresponding to red (R), green (G), and blue (B) in which, for example, the pixels are arrayed at a pitch of 800 dpi in the longitudinal direction (main scanning direction). At the position of the color sensor 50, light emitted by the white LED 60 is reflected by the surface of the sheet P conveyed through the gap G. The reflected light from the image fixed on the surface of the sheet P is input to each of the RGB line sensors of the sensor 63. The sensor 63 reads the image formed on the surface of the sheet P at a predetermined timing the sheet P is conveyed through the gap G, thereby obtaining RGB color information at a spatial resolution of 800 dpi in the main and sub-scanning directions. In addition, the color sensor 50 can obtain 12-bit 4096-tone signal information for each channel.

In this embodiment, the image forming apparatus 10 may include a density sensor 41 near the intermediate transfer member 27 in addition to the color sensor 50. In this case, the density of the patch image formed on the surface of the intermediate transfer member 27 can be measured using the density sensor 41.

<Control Mechanism of Image Forming Apparatus>

Figure 3A:
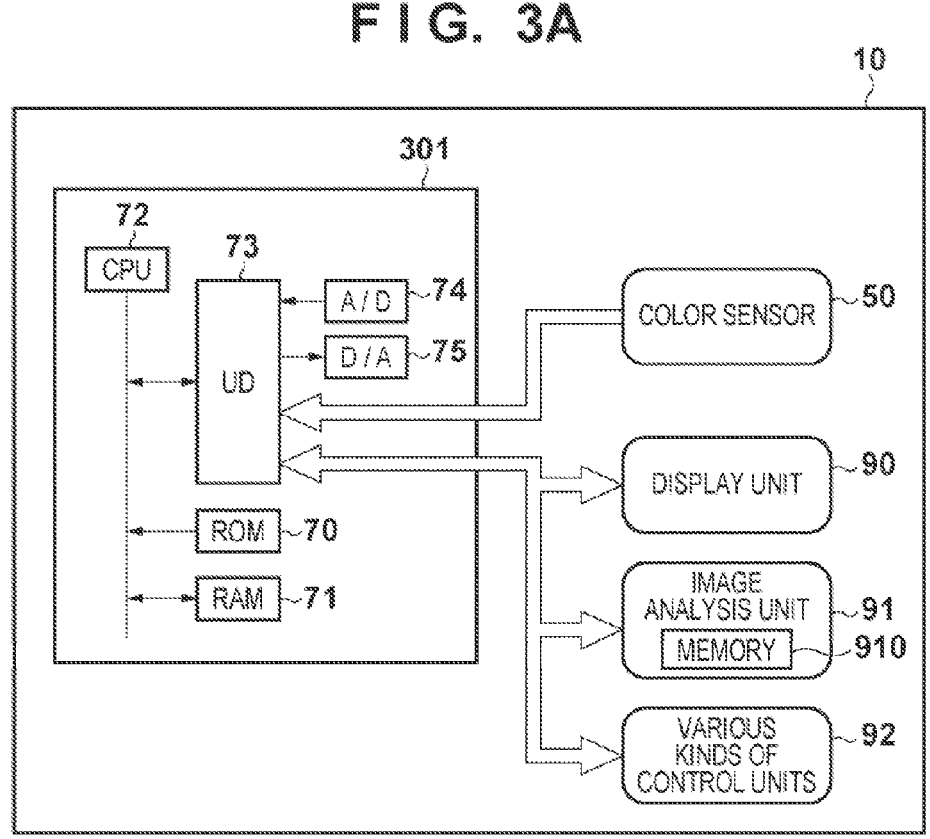
FIGS. 3A and 3B are block diagrams showing the arrangements of a control mechanism and an image analysis unit 91 of the image forming apparatus according to the first embodiment, respectively.

The control mechanism of the image forming apparatus 10 will be described next with reference to FIG. 3A. A control board 301 of the image forming apparatus 10 includes a CPU 72, a ROM 70 that stores the control program of the image forming apparatus 10, and a RAM 71 on which the CPU 72 expands the control program read out from the ROM 70. The ROM 70 and the RAM 71 are connected to the CPU 72. The RAM 71 is also used to temporarily store data necessary for the CPU 72 to execute the control program, and rasterize the image data signal to be processed by the CPU 72. The CPU 72 is also connected to an I/O 73 serving as an interface element and connected to an A/D converter 74, a D/A converter 75, and devices outside the control board 301 via the I/O 73. The CPU 72 in the control board 301 transmits/receives information to/from these devices via the I/O 73.

The above-described color sensor 50, a display unit 90 that displays the operation state of the image forming apparatus 10, various kinds of instructions, and the like, and an image analysis unit 91 that analyzes an image read by the color sensor 50 are connected to the control board 301. The image analysis unit 91 includes a memory 910 configured to store analysis target image data, image data under analysis processing, or analysis result data. Note that the image analysis unit 91 may be provided as dedicated hardware or software executable by the CPU 72. Various kinds of control units 92 that control the units in the image forming apparatus 10 are also connected to the control board 301.

Figure 13:
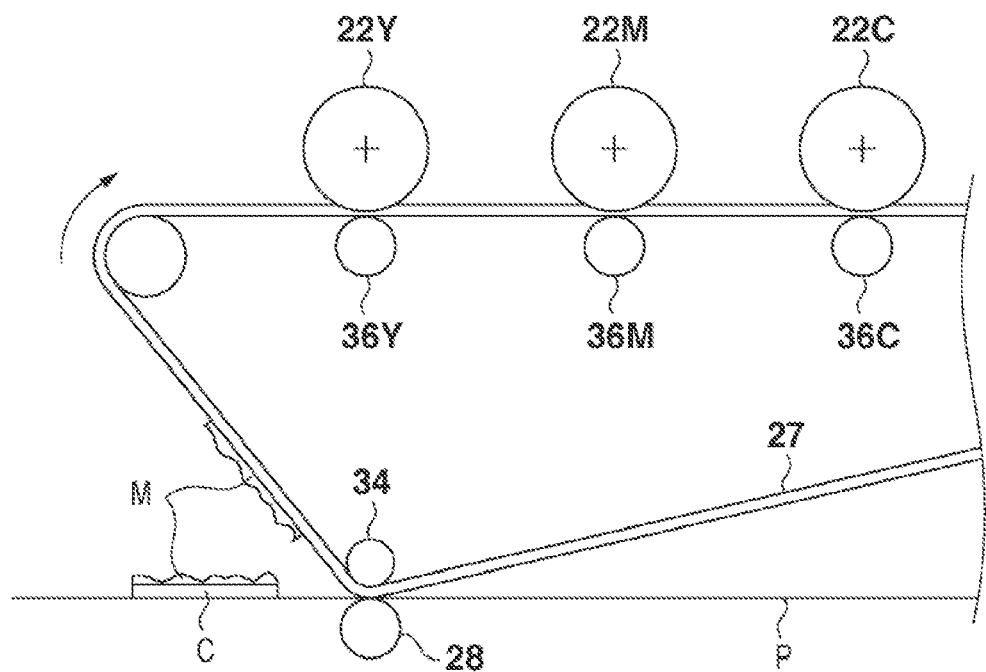
FIG. 13 is a view for explaining a transfer error caused by the transfer process of the image forming apparatus.

In the image forming apparatus 10 having the above-described arrangement and control mechanism, color unevenness caused by a specific process such as the transfer process or fixing process included in the image forming process poses a problem, as described above. For example, FIG. 13 illustrates a state in which a multicolor toner image formed by overlaying an M toner layer and a C toner layer on the surface of the intermediate transfer member 27 is secondary-transferred to the sheet P, and in this case, the transfer voltage in the secondary transfer process is insufficient. As shown in FIG. 13, if the transfer voltage is insufficient, only part of the M toner layer may be transferred to the sheet P, and the other part may remain on the intermediate transfer member 27, although the C toner layer is normally transferred from the intermediate transfer member 27 to the sheet P. In the multicolor image fixed to the sheet P in this state, the color reproducibility may degrade due to color imbalance, or color unevenness may occur if color reproducibility degradation occurs nonuniformly in the image, as described above.

Figure 14:
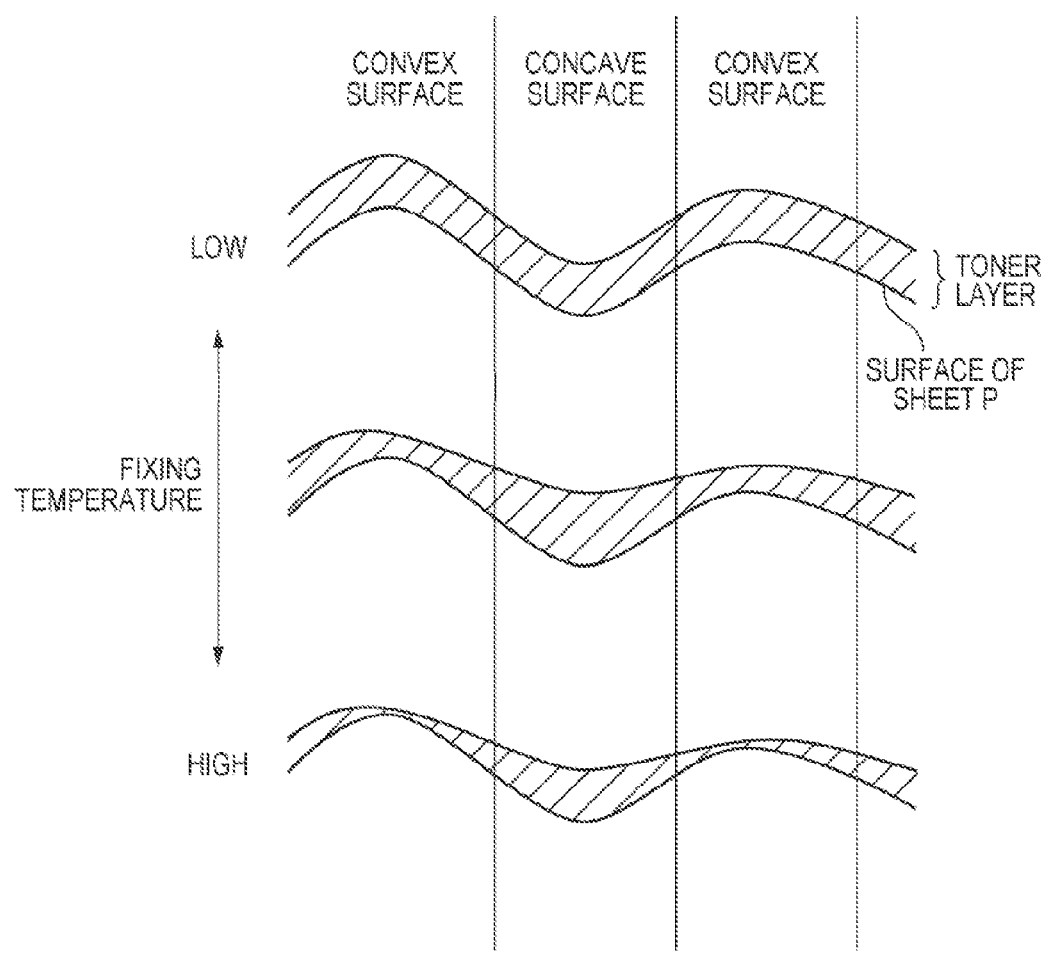
FIG. 14 is a view for explaining a fixing error caused by the fixing process of the image forming apparatus.

For example, FIG. 14 illustrates a state in which the sheet P has small unevenness on its surface, and the thickness of the formed toner layer becomes uneven in accordance with the change in the fixing temperature. As shown in FIG. 14, when the fixing temperature is low, the thickness of the toner layer formed on the convex and concave portions of the sheet P is not uneven. On the other hand, as the fixing temperature rises, the toner layer formed on the convex portions is pressed into the concave portions, and the thickness of the toner layer is uneven, as can be seen. As a result, the color is developed to high saturation at the concave portions where the toner layer is thick and to low saturation at the convex portions where the toner layer is thin. The saturation unevenness occurs as color unevenness for each small region of the image in accordance with the unevenness of the sheet.

In the image forming apparatus 10 according to this embodiment, the color of a color correction patch image formed on the sheet P is measured by the color sensor 50 that has a spatial resolution suitable to detect color unevenness generated in the patch image. Additionally, the image analysis unit 91 executes analysis processing to be described below for the obtained colorimetric value. As the color sensor 50 that performs colorimetry of the patch image, the image forming apparatus 10 uses the color sensor 50 having a spatial resolution corresponding to the spatial frequency of color unevenness caused by a specific process such as the transfer process or the fixing process. The image forming apparatus 10 thus detects the color unevenness caused by the specific process based on objective evaluation. In addition, the image forming apparatus 10 adjusts the image forming conditions concerning the process that causes the color unevenness based on the detection result, thereby reducing color unevenness caused by the process.

<Analysis Processing of Image Analysis Unit>

Figure 3B:
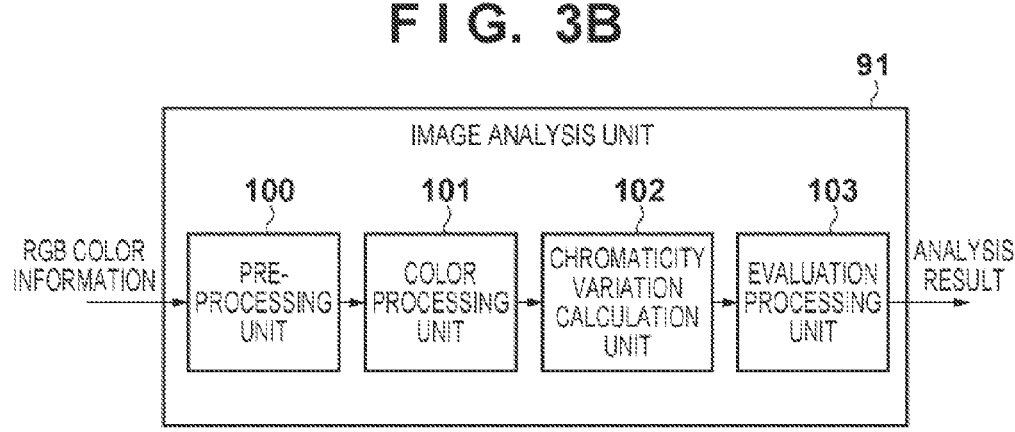
Figure 4:
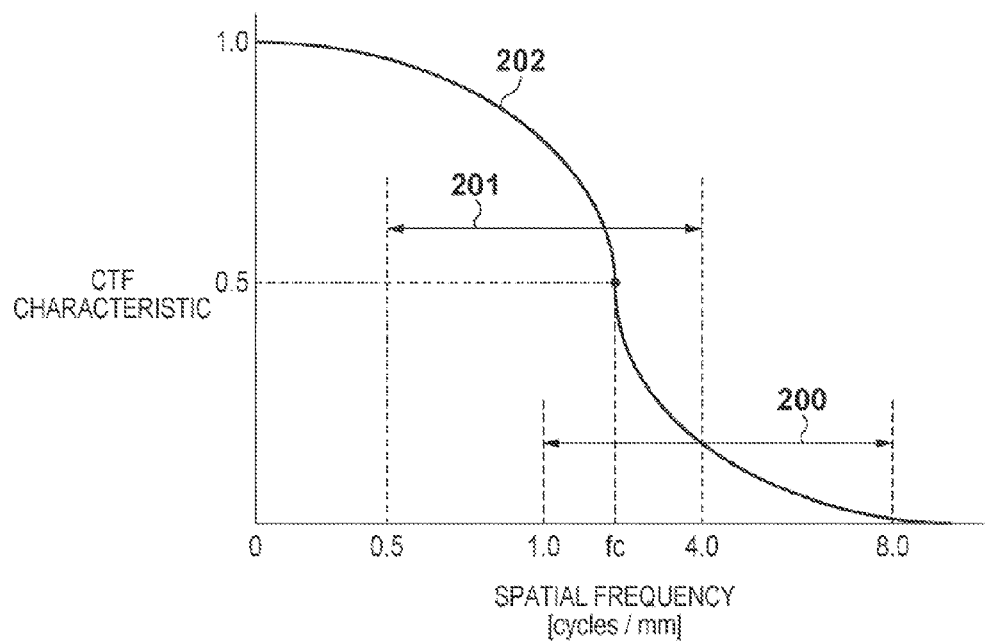
FIG. 4 is a graph showing an example of the spatial frequency characteristic (CTF characteristic) of the color sensor 50 according to the first embodiment.

Analysis processing of the image analysis unit 91 will be described with reference to FIG. 3B. A Contrast Transfer Function (CTF) exists as a spatial frequency characteristic serving as the indicator of the spatial resolution of the color sensor 50 that performs colorimetry of a patch image formed on the sheet P by the image forming process of the image forming apparatus 10. FIG. 4 is a graph showing an example of the CTF characteristic of the color sensor 50. The CTF characteristic is generally used to evaluate a light transfer characteristic in the optics or image engineering and thus evaluates the contrast of an image with respect to the spatial frequency. The CTF characteristic is a contrast transfer characteristic measured especially when a rectangular wave is input, and is represented by a value from 0 to 1. Letting $I_{max}$ be the maximum value of the output from the color sensor 50, and $I_{min}$ be the minimum value, the CTF characteristic is given by $$CTF = (I_{max} - I_{min}) \quad (1)$$

As an indicator representing the CTF characteristic shown in FIG. 4, a spatial frequency $f_c$ at which a characteristic value 202 of the CTF characteristic lowers to a predetermined level (for example, 0.5) is introduced.

When subjectively evaluating color unevenness caused in the image forming process, the spatial frequency characteristic of the color unevenness may affect the evaluation. For this reason, to objectively and accurately evaluate color unevenness, the spatial frequency characteristic of the color unevenness needs to be taken into consideration. Together with the characteristic value 202 of the spatial frequency characteristic, FIG. 4 shows the spatial frequency $f_c$ that is suitable for evaluating color unevenness caused by the transfer or fixing process and that is obtained in advance based on preliminary subjective evaluation. The appropriate spatial frequency $f_c$ changes in accordance with the spatial frequency of color unevenness caused by each process. According to the preliminary subjective evaluation, as shown in FIG. 4, the spatial frequency $f_c$ of the color sensor 50 is desired to be 0.5 (inclusive) to 4.0 (inclusive) cycles/mm (range 201 in FIG. 4) to evaluate (detect) color unevenness caused by fixing. In addition, to evaluate (detect) color unevenness caused by transfer, the spatial frequency $f_c$ of the color sensor 50 is desired to be 1.0 (inclusive) to 8.0 (inclusive) cycles/mm (range 200 in FIG. 4).

In the image forming apparatus 10 according to this embodiment, the color sensor 50 having the spatial resolution corresponding to the spatial frequency of the color unevenness caused by a specific process included in the image forming process performs colorimetry of a patch image. This makes it possible to improve the detection accuracy of color unevenness caused by the specific process and more accurately evaluate an image defect caused by the process. When color unevenness is detected from the patch image, the image forming apparatus 10 can specify that the process corresponding to the spatial resolution of the color sensor 50 is the cause of the color unevenness that has occurred in the patch image and can lead to degradation of image quality caused by the color unevenness. The spatial frequency $f_c$ is used below as the parameter that determines the spatial resolution of colorimetry by the color sensor 50 in the image forming apparatus 10. More specifically, the image forming apparatus 10 uses, for colorimetry, the color sensor 50 for which the spatial frequency $f_c$ is included in the range corresponding to the spatial frequency of color unevenness caused by the specific process included in the image forming process. For example, for the transfer process or the fixing process, the color sensor 50 for which the spatial frequency $f_c$ is included in the range shown in FIG. 4 is used for colorimetry.

Note that as is apparent from FIG. 4, the spatial frequency $f_c$ used to detect color unevenness caused by transfer is higher than that when detecting color unevenness caused by fixing. This is because a relatively high spatial frequency affects subjective evaluation more in color unevenness caused by transfer than in color unevenness caused by fixing. In addition, as is apparent from FIG. 4, to accurately detect both color unevenness caused by transfer and that caused by fixing, colorimetry is performed at a spatial resolution corresponding to the spatial frequency $f_c$ within the range of 1.0 (inclusive) to 4.0 (inclusive) cycles/mm where the ranges 200 and 201 overlap. On the other hand, to accurately detect at least one of color unevenness caused by transfer and that caused by fixing, colorimetry is performed at a spatial resolution corresponding to the spatial frequency $f_c$ of 0.5 (inclusive) to 8.0 (inclusive) cycles/mm.

(Preprocessing Unit 100)

To accurately detect both color unevenness caused by the transfer process and that caused by the fixing process, the color sensor 50 having a spatial resolution determined by the spatial frequency $f_c$ within the range of 1.0 (inclusive) to 4.0 (inclusive) cycles/mm common to these processes is used. However, the color sensor 50 may perform colorimetry at a spatial resolution higher than that determined by the spatial frequency $f_c$. In this case, a preprocessing unit 100 in the image analysis unit 91 performs the following processing for the colorimetric value obtained by the color sensor 50, thereby adjusting the spatial resolution.

In the image forming apparatus 10 according to this embodiment, the colorimetric value (RGB color information) obtained by colorimetry of the color sensor 50 is input to the preprocessing unit 100 in the image analysis unit 91 via the control board 301. To obtain the colorimetric value of the spatial resolution suitable for detecting color unevenness caused by a specific process from the input colorimetric value, the preprocessing unit 100 executes averaging processing for the colorimetric values of a plurality of adjacent colorimetric positions. More specifically, the preprocessing unit 100 calculates the average of colorimetric values of a plurality of colorimetric positions belonging to each region having a predetermined area in the patch image that is the read target of the color sensor 50. The area of the region to be averaged can be set based on the spatial frequency $f_c$. For example, different areas are set in correspondence with color unevenness caused by fixing and that caused by transfer. For color unevenness caused by fixing, a pixel area having a size of about 32×32 pixels is set as the region to be averaged. For color unevenness caused by transfer, a pixel area having a size of about 8×8 pixels is set as the region to be averaged. The preprocessing unit 100 can thus calculate the colorimetric value of the spatial resolution determined by the spatial frequency $f_c$. Finally, the preprocessing unit 100 outputs the calculated average value of the RGB color information to a color processing unit 101 as the colorimetric value (RGB color information) at each colorimetric position. When the preprocessing unit 100 executes such averaging processing, the color sensor 50 and the preprocessing unit 100 function as the colorimetric unit.

The range of the spatial frequency $f_c$ from 1.0 (inclusive) to 4.0 (inclusive) cycles/mm corresponds to the range of about 0.25 (inclusive) to 1.0 (inclusive) mm in the real space. When the color sensor 50 is, for example, a color CCD sensor having a resolution of 800 dpi, this range corresponds to an averaged pixel area from 4×4 pixels to 64×64 pixels. The range of the spatial frequency $f_c$ from 0.5 (inclusive) to 8.0 (inclusive) cycles/mm corresponds to the range of about 0.13 (inclusive) to 2.0 (inclusive) mm in the real space. When the color sensor 50 is, for example, a color CCD sensor having a resolution of 800 dpi, this range corresponds to an averaged pixel area from 4×4 pixels to 64×64 pixels.

(Color Processing Unit 101)

Figure 5:
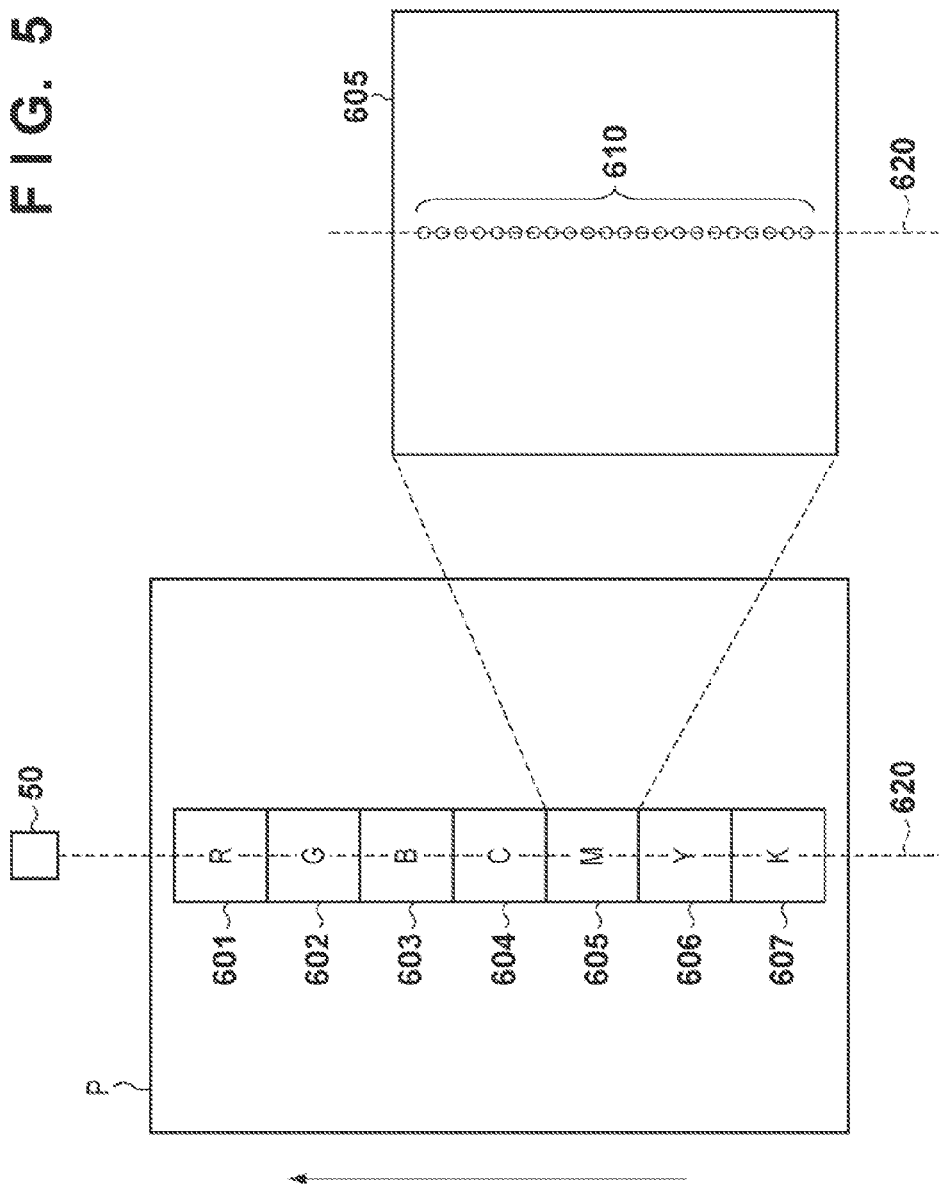
FIG. 5 is a view showing an example of the layout of a test chart according to the first embodiment.

As for the RGB color information obtained by the preprocessing unit 100, the color processing unit 101 then converts the chromaticity coordinates into Lab color information. A chromaticity means a color value obtained by quantifying the nature of a color stimulus determined by chromaticity coordinates. Chromaticity coordinates (color value coordinates) use a colorimetric system such as "L (brightness) ab", "Lc (saturation) h (hue)", "xyz", or "RGB". The color processing unit 101 holds a conversion table to be used to convert chromaticity coordinates from RGB color information to Lab color information. The Lab color information after conversion by the color processing unit 101 is held by the memory 910 in the image analysis unit 91. The color processing unit 101 also performs a predetermined number of times (N times) of sampling of colorimetric values (chromaticity values) obtained by the processing of the preprocessing unit 100 and the color processing unit 101 for, for example, a plurality of different colorimetric positions in the patch image. The color processing unit 101 stores the obtained Lab color information in the memory 910 as sample values. For example, assume that, as shown in FIG. 5, patch images 601 to 607 are printed on the sheet P conveyed in the direction of the arrow, and the color sensor 50 performs colorimetry of the patch images. In this case, the color sensor 50 performs colorimetry at a plurality of different colorimetric positions (610 in FIG. 5) in each patch image, as indicated by the enlarged M patch image 605.

(Chromaticity Variation Calculation Unit 102)

Next, a chromaticity variation calculation unit 102 reads out the N chromaticity values stored in the memory 910 and calculates a statistic value based on the second order central moment of a specific color component as the variation with respect to the average value of the readout chromaticity values. In this embodiment, an example will be described in which the standard deviation of the N chromaticity values stored in the memory 910 is calculated as the statistic value. Note that as the statistic value, a variance may be used in place of the standard deviation. Alternatively, not the second order but a third or higher order central moment may be used as the statistic value. Any n-th (n is an integer of 2 or more) order central moment is usable. Let $L_{ave}$, $a_{ave}$, and $b_{ave}$ be the average values of the measured chromaticity values, and $\Delta L_i$, $\Delta C_i$, and $\Delta H_i$ be the deviations of the brightness, saturation, and hue components from the average values. In this case, for i=1 to N (N is the number of samples), the deviations $\Delta L_T$, $\Delta C_T$, and $\Delta H_T$ are calculated as $$\begin{pmatrix} \Delta L_i \\ \Delta C_i \\ \Delta H_i \end{pmatrix} = \begin{pmatrix} 1 & 0 & 0 \\ 0 & \cos\theta & \sin\theta \\ 0 & -\sin\theta & \cos\theta \end{pmatrix} \begin{pmatrix} L_i - L_{ave} \\ a_i - a_{ave} \\ b_i - b_{ave} \end{pmatrix} \quad (2)$$

where $\theta = \tan^{-1}(b_{ave}/a_{ave})$. Standard deviations $\sigma_L$, $\sigma_C$, and $\sigma_H$ of the brightness, saturation, and hue components are calculated as $$\begin{cases} \sigma_L = \sqrt{\dfrac{\sum_{i=1}^{N} \Delta L_i^2}{N-1}} \\ \sigma_C = \sqrt{\dfrac{\sum_{i=1}^{N} \Delta C_i^2}{N-1}} \\ \sigma_H = \sqrt{\dfrac{\sum_{i=1}^{N} \Delta H_i^2}{N-1}} \end{cases} \quad (3)$$

To examine objective evaluation according to this embodiment, the results of subjective evaluation and objective evaluation performed for 19 blue (B) patch images having a uniform (solid) tone level will be shown. The 19 patch images were prepared by forming images under a plurality of image forming conditions while independently changing the transfer and fixing conditions. In this way, the degree of color unevenness caused by transfer or fixing was changed for each patch image. The subjective evaluation was done under the condition that 14 test subjects visually evaluate the patch images in an environment with a color temperature of 5,000 K and an illuminance of 600 lx. The subjective evaluation was done using the ordinal scale by causing the test subjects to rank the color unevenness caused by transfer or fixing. In addition, the standard deviation in a specific color component of the colorimetric value was obtained for each process as the objective evaluation value of color unevenness. More specifically, the standard deviation $\sigma_H$ of the hue component was obtained for color unevenness caused by transfer, and the standard deviation $\sigma_C$ of the saturation component was obtained for color unevenness caused by fixing.

FIG. 6 shows the relationship between the subjective evaluation value and the objective evaluation value of color unevenness caused by transfer 702 or fixing 701 as the above-described evaluation results. FIG. 7 shows graphs that plot the values shown in FIG. 6. The subjective evaluation value is obtained by normalizing the evaluation value for each image by 100 points. As the score rises, the test subject is impressed by larger degradation of the patch image quality. As shown in FIGS. 6 and 7, the subjective evaluation value and the objective evaluation value strongly correlate with each other. A high correlation coefficient of 0.94 was obtained for color unevenness caused by transfer, whereas a high correlation coefficient of 0.96 was obtained for color unevenness caused by fixing. This result reveals that using the standard deviation of the colorimetric value (chromaticity) in place of subjective evaluation allows to objectively evaluate the color unevenness caused by the transfer or fixing process. In particular, when the standard deviation $\sigma_H$ of the hue component and the standard deviation $\sigma_C$ of saturation component out of the color components are used, each of the color unevenness caused by the transfer process and that caused by the fixing process can objectively be evaluated, as can be seen.

An evaluation processing unit 103 of the image analysis unit 91 objectively evaluates the input image based on the value obtained in the above-described way by the chromaticity variation calculation unit 102. In this embodiment, the evaluation processing unit 103 objectively evaluates color unevenness caused by transfer or fixing based on the result of comparison between a predetermined threshold (reference value) and the standard deviation of each color component of the colorimetric value calculated by the chromaticity variation calculation unit 102 in accordance with equations (3). More specifically, when the standard deviation of each color component calculated by the chromaticity variation calculation unit 102 is equal to or smaller than the predetermined threshold, the evaluation processing unit 103 outputs a determination result representing that the color unevenness caused by transfer or fixing falls within the allowable range. On the other hand, when the standard deviation of each color component exceeds the predetermined threshold, the evaluation processing unit 103 outputs a determination result representing that color unevenness caused by a specific process has been detected.

The threshold used by the evaluation processing unit 103 can be determined by various methods. For example, the threshold may be determined in advance based on the relationship between the subjective evaluation value and the objective evaluation value shown in FIGS. 6 and 7. Alternatively, an image having color unevenness corresponding to the limit (threshold) in subjective evaluation may be prepared in advance, and a subjective evaluation value corresponding to the objective evaluation value may be determined as the threshold. Note that although the threshold is mainly set in advance when shipping the product of the image forming apparatus, a value input by a serviceman or a user after the product shipment may be set.

In this embodiment, as an example, the objective evaluation values (15 and 8.6 for color unevenness caused by transfer and that caused by fixing, respectively) corresponding to the subjective evaluation value 50 in the graphs of FIG. 7 are set as the thresholds to be used by the evaluation processing unit 103. These values are stored in the memory 910 of the image analysis unit 91. The evaluation processing unit 103 detects color unevenness caused by transfer and fixing by comparing the thresholds with the standard deviations $\sigma_H$ and $\sigma_C$, respectively, out of the standard deviations $\sigma_L$, $\sigma_C$, and $\sigma_H$ of the color components calculated by the chromaticity variation calculation unit 102.

Upon detecting color unevenness in the patch image, the evaluation processing unit 103 can specify that the process corresponding to the spatial frequency $f_c$ that is the parameter of the color sensor 50 used for colorimetry is the cause of the color unevenness in the patch image.

<Color Unevenness Evaluation and Detection Procedure>

A procedure of objectively evaluating color unevenness caused by a specific process in the image forming apparatus 10 according to this embodiment will be described next with reference to the flowchart of FIG. 8. Note that the processing of each step of the flowchart is executed under the control of the CPU 72 on the control board 301.

In step S101, the CPU 72 prints a test chart for color unevenness evaluation on the sheet P. FIG. 5 shows an example of the layout of the test chart. The patch images 601 to 607 having a uniform tone level are printed on the sheet P. FIG. 5 shows an example in which the R, G, and B multicolor patch images 601 to 603 and the C, M, Y, and K single-color patch images 604 to 607 are serially arranged along the conveyance direction of the sheet P indicated by the arrow at such positions that the color sensor 50 can perform colorimetry of the patch images on the conveyance path. After printing the test chart, the process advances to step S102.

In step S102, the CPU 72 conveys the sheet P with the test chart printed thereon to the position of the color sensor 50 on the conveyance path and causes the color sensor 50 to perform colorimetry of the patch images printed on the sheet P. This colorimetry is done using the color sensor 50 having a spatial resolution determined by the spatial frequency characteristic in which the spatial frequency $f_c$ falls within the range corresponding to the spatial frequency of color unevenness of the evaluation target caused by a specific process. That is, the color sensor 50 having a spatial resolution suitable for detecting color unevenness caused by the specific process is used. For example, to detect color unevenness caused by the transfer process, the CPU 72 sets the spatial frequency $f_c$ within the spatial frequency range from 1.0 (inclusive) to 8.0 (inclusive) cycles/mm. Note that the color sensor 50 can be implemented by providing the image forming apparatus 10 with hardware having the above-described spatial resolution. Alternatively, the CPU 72 may adjust the spatial frequency $f_c$ of the color sensor 50 by software processing.

Otherwise, to detect not color unevenness caused by a single specific process but color unevennesses caused by a plurality of specific processes simultaneously, the CPU 72 causes the color sensor 50 having a spatial resolution corresponding to all of the plurality of processes to perform the colorimetry. For example, to detect color unevenness caused by transfer and that caused by fixing simultaneously, the color sensor 50 need only have a spatial frequency characteristic in which the spatial frequency $f_c$ falls within the spatial frequency range from 1.0 (inclusive) to 4.0 (inclusive) cycles/mm.

Using the color sensor 50, the CPU 72 starts colorimetry of the patch images on the sheet P. The color sensor 50 performs colorimetry at a plurality of different colorimetric positions in each patch image (for example, 22 positions 610 indicated by circles in FIG. 5) along a line 620 in FIG. 5 as the sheet P is conveyed. After that, the process advances to step S103. Note that in step S102, colorimetry may be performed using the color sensor 50 having a spatial resolution higher than the spatial frequency $f_c$ suitable for detecting specific color unevenness, and the above-described averaging processing may be executed for the obtained colorimetric values to do adjustment to obtain a lower spatial resolution.

In step S103, the CPU 72 controls the chromaticity variation calculation unit 102 to calculate a standard deviation as a statistic value based on the second order central moment of a specific color component of the colorimetric values obtained by colorimetry of the color sensor 50. In step S104, the CPU 72 controls the evaluation processing unit 103 to evaluate the color unevenness based on the calculated standard deviation. More specifically, the CPU 72 compares the calculated standard deviation with a reference value and detects, based on whether the standard deviation falls within a predetermined allowable range, that color unevenness has occurred in the patch image by a specific process. In step S104, upon detecting that color unevenness has occurred in the patch image, the CPU 72 evaluates that the process corresponding to the spatial frequency $f_c$ of the color sensor 50 used in the colorimetry of step S102 is the cause of the color unevenness in the patch image.

To simultaneously detect color unevennesses caused by a plurality of specific processes, the CPU 72 calculates the standard deviation of the colorimetric values for the color component used to specify color unevenness caused by each process in step S103. Then, in step S104, the CPU 72 causes the evaluation processing unit 103 to detect based on the calculated standard deviation of each color component that color unevenness has occurred in the patch image. For example, the evaluation processing unit 103 can detect color unevenness caused by transfer based on the standard deviation $\sigma_H$ of the hue component out of the calculated standard deviations of the colorimetric values, and color unevenness caused by fixing based on the standard deviation $\sigma_C$ of the saturation component.

After that, the CPU 72 may display the detection result of step S103 on the display unit 90 in step S105. This allows the serviceman or the user to visually confirm the presence/absence of color unevenness detection. Alternatively, the detection result may be held in the internal memory (memory 910 or the like) of the image forming apparatus 10 and displayed on the display unit 90 in accordance with an instruction of the serviceman or the user. The serviceman or the user can thus recognize the cause of the image defect and appropriately and quickly deal with the image defect. When the image forming apparatus 10 is connected to the Internet, an external network device may be allowed to obtain the detection result held in the memory.

As described above, the image forming apparatus according to this embodiment performs colorimetry of a patch image at a spatial resolution corresponding to the spatial frequency of color unevenness caused by a specific process included in the image forming process. In addition, a statistic value based on the second order central moment of a specific color component of colorimetric values obtained by performing colorimetry of a patch image at the spatial resolution is compared with a reference value, thereby detecting that color unevenness caused by the specific process has occurred in the patch image. In this embodiment, the patch image is thus evaluated in consideration of the spatial frequency of color unevenness caused by the specific process. This allows to specify the process corresponding to the spatial resolution of colorimetry as the cause of color unevenness. It is also possible to improve the color unevenness detection accuracy and specify the process that leads to degradation of image quality caused by color unevenness. That is, an image defect caused by a specific process can be evaluated more appropriately.

In this embodiment, a patch image is evaluated using not the difference from an absolute target value but a statistic value such as a standard deviation based on the second order central moment for a specific color component of colorimetric values. This makes it possible to determine what leads to degradation of quality of the patch image, color unevenness caused by a specific process or a variation in the amount of applied toner depending on the printing environment or the like.

Note that in this embodiment, color components such as brightness, saturation, and hue in the Lch colorimetric system are used as the color components of chromaticity to be used to evaluate color unevenness. However, the present invention is not limited to those. For example, variations may be calculated by arbitrarily combining color components of other chromaticity coordinates including a* and b* of the Lab colorimetric system with the Lch colorimetric system.

In this embodiment, a CCD line sensor is used as the color sensor 50. However, the present invention is not limited to this. For example, the color sensor 50 may use a photomultiplier such as a microphotometer or a microdensitometer having an aperture diameter of 0.5 mm or less to detect a light intensity. In the above description, a color sensor including RGB three-color filters. However, accurate colorimetry can be done even using a color sensor including four or more kinds of filters with an additional multicolor filter or a spectrographic color sensor.

In this embodiment, a system in which the color sensor 50 is arranged downstream of the fixing unit 30 on the conveyance path has been described. However, an image reader may be connected to the image forming apparatus 10 as an integrated or external device. In this case, the image reader is used as the colorimeter in place of the color sensor 50. However, according to the arrangement of this embodiment, colorimetry of a patch image can be performed online while executing printing of the test chart (patch images). This enables to save the user from setting the sheet P with printed patch images on the image reader for colorimetry.

Second Embodiment

In the above-described first embodiment, a patch image is evaluated at a spatial resolution considering the spatial frequency of color unevenness caused by a specific process included in the image forming process, thereby improving the detection accuracy of color unevenness caused by the specific process. In the second embodiment to be described below, the image forming condition concerning the specific process is adjusted based on the evaluation result in the image forming apparatus according to the first embodiment, thereby reducing color unevenness caused by the process and reducing degradation of image quality. Note that a description of parts common to the first embodiment will be omitted for the sake of simplicity.

A procedure of adjusting an image forming condition in an image forming apparatus 10 according to this embodiment will be described below with reference to the flowchart of FIG. 9. A case will particularly be explained below in which color unevenness caused by the transfer process and that caused by the fixing process are detected from the standard deviations of saturation and hue of colorimetric values, respectively, and the image forming condition of the process for which color unevenness has been detected is adjusted. Note that the processing of each step of the flowchart is executed under the control of a CPU 72 on a control board 301. The processes of steps S201 to S203 are the same as those of steps S101 to S103 of the first embodiment. Note that the test chart shown in FIG. 5 is used as the test chart to be printed on a sheet P.

(Processing Concerning Fixing Process)

Figure 11:
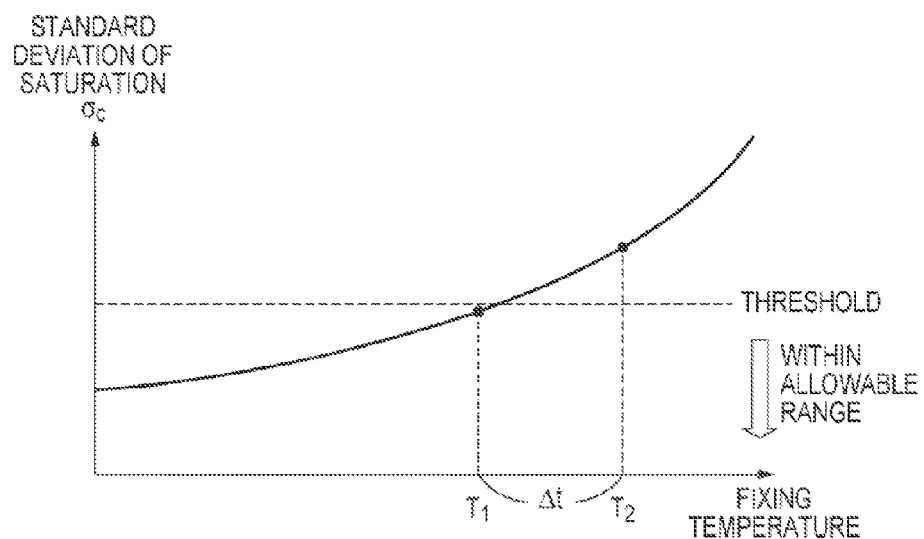
FIG. 11 is a graph showing an example of a standard deviation $\sigma_C$ of the saturation of a B patch image according to the second embodiment.

In step S204, the CPU 72 causes an evaluation processing unit 103 to evaluate a standard deviation $\sigma_C$ of saturation, thereby evaluating color unevenness caused by the fixing process. FIG. 11 is a graph showing an example of the relationship between the fixing temperature and the standard deviation $\sigma_C$ of saturation of a blue (B) patch image. As shown in FIG. 11, the standard deviation $\sigma_C$ of saturation monotonously increases as the fixing temperature rises. When the standard deviation exceeds a predetermined reference value (threshold), color unevenness occurs in the patch image. Hence, the range below the threshold is the predetermined allowable range where no color unevenness occurs in the patch image. In step S204, the CPU 72 determines whether the calculated standard deviation $\sigma_C$ of saturation falls within the allowable range. If the standard deviation $\sigma_C$ of saturation falls within the allowable range, the CPU 72 detects that color unevenness has occurred and specifies that the cause of the color unevenness is the fixing process. After that, the process advances to step S205. On the other hand, if the standard deviation $\sigma_C$ of saturation falls outside the allowable range, the CPU 72 determines that no color unevenness has occurred, and the process advances to step S207.

In step S207, the CPU 72 adjusts the image forming condition concerning the fixing process to reduce color unevenness caused by the fixing process. More specifically, if the current fixing temperature is $T_1$ corresponding to the standard deviation $\sigma_C$ of saturation more than the predetermined threshold, the CPU 72 changes the fixing temperature to $T_2$ lower by $\Delta t$, as shown in FIG. 11. After that, in step S209, the CPU 72 may display information about the fixing temperature after the change and other image forming conditions on a display unit 90 to notify the serviceman or the user that the fixing temperature has been changed. Note that the processes of steps S201 to S204, S207, and S209 are executed until the standard deviation $\sigma_C$ of saturation falls within the predetermined allowable range. The color unevenness caused by the fixing process can thus be reduced to the allowable range.

(Processing Concerning Transfer Process)

Figure 12:
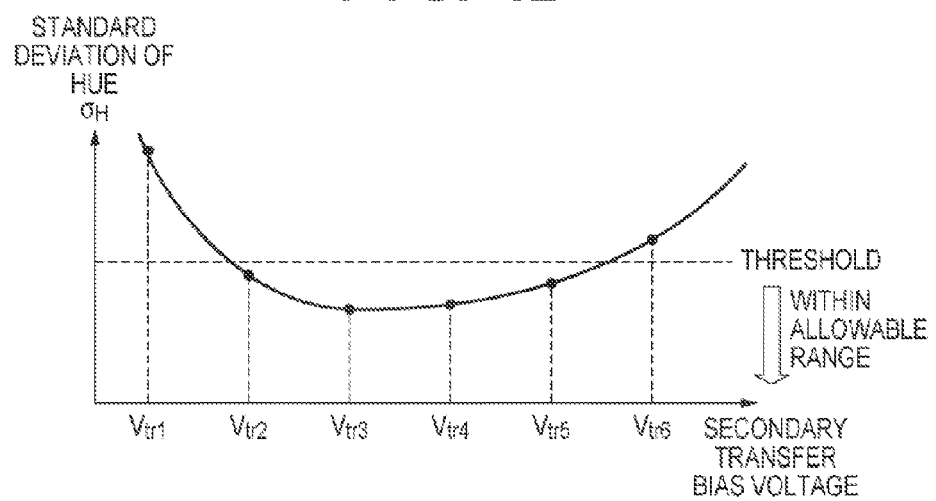
FIG. 12 is a graph showing an example of a standard deviation $\sigma_H$ of the hue of the B patch image according to the second embodiment.

When the above-described processing concerning the fixing process is completed, the process advances from step S204 to step S205. In step S205, the CPU 72 determines whether the calculated standard deviation $\sigma_H$ of hue falls within a predetermined allowable range. FIG. 12 is a graph showing an example of the relationship between the transfer voltage and the standard deviation $\sigma_H$ of hue of a blue (B) patch image. As shown in FIG. 12, the standard deviation $\sigma_H$ of hue exhibits a change in a downward concave pattern including one point of inflection with respect to the transfer voltage. A region where the standard deviation $\sigma_H$ of hue exceeds a predetermined threshold corresponds to a region where a transfer error occurs. For example, the transfer voltage is insufficient in a region where a transfer error occurs under $V_{tr2}$. On the other hand, the transfer voltage is too high in a region where a transfer error occurs above $V_{tr5}$.

Figure 10:
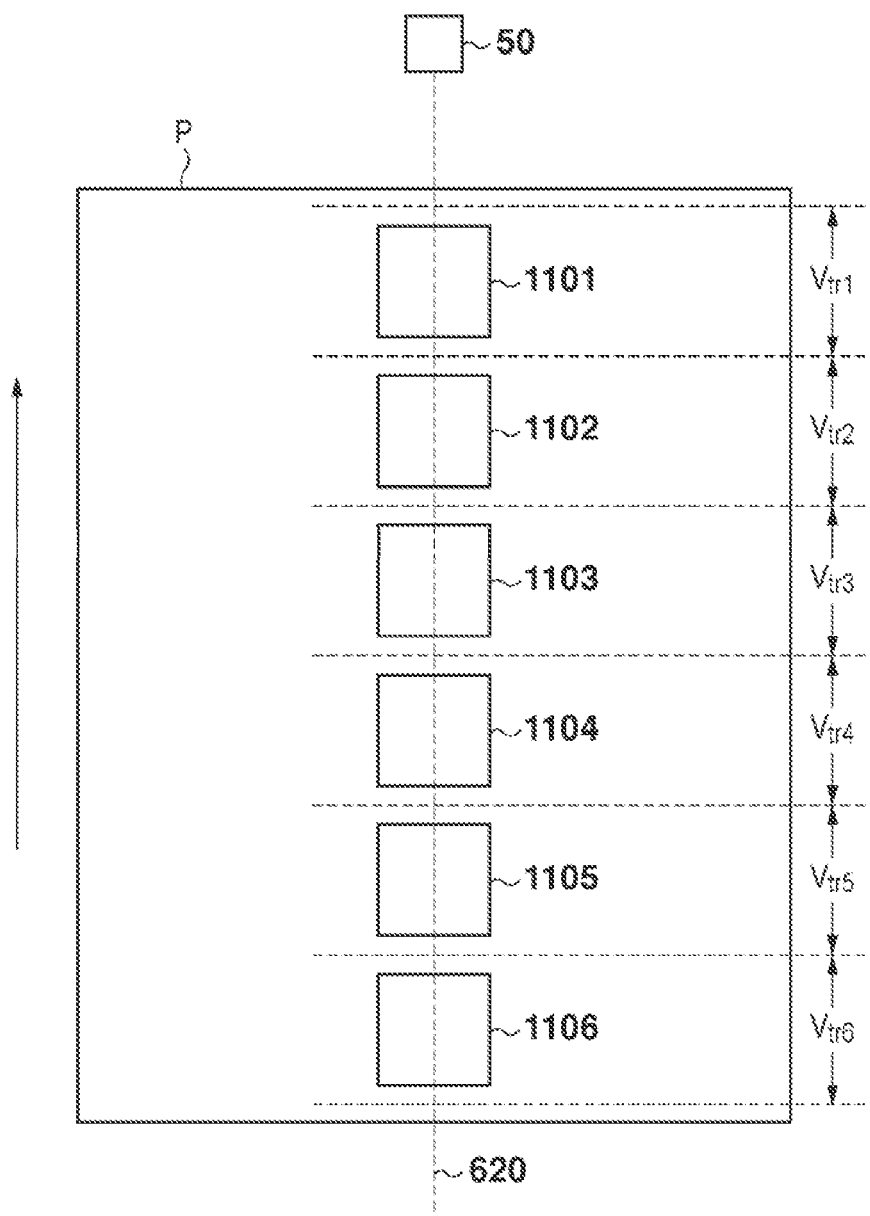
FIG. 10 is a view showing another example of the layout of a test chart according to the second embodiment.

The layout shown in FIG. 10 may be used in place of the test chart layout shown in FIG. 5 to do evaluation for the transfer process. In the test chart of FIG. 10, patch images 1101 to 1106 are printed on the sheet P conveyed in the direction of the arrow, and a color sensor 50 performs colorimetry of the patch images, as in FIG. 5. When printing the test chart, the image forming apparatus 10 performs printing while changing the secondary transfer voltage for each patch image. For example, the patch images 1101 to 1106 are printed by setting the secondary transfer voltage to $V_{tr1}$ to $V_{tr6}$ in ascending order, as shown in FIG. 10. This makes it possible to simultaneously calculate the standard deviations $\sigma_H$ of hue for a plurality of secondary transfer voltages in step S203 by printing one test chart.

In this case, in step S205, the CPU 72 determines whether each calculated standard deviation $\sigma_H$ falls within the predetermined allowable range. More specifically, if all standard deviations $\sigma_H$ exceed the predetermined threshold shown in FIG. 12, the CPU 72 detects that color unevenness has occurred and specifies that the cause of the color unevenness is the transfer process. After that, the process advances to step S208. In step S208, the CPU 72 adjusts the image forming condition concerning the transfer process to reduce color unevenness caused by the transfer process. For example, the CPU 72 observes the change in the standard deviation $\sigma_H$ of hue for the transfer voltages $V_{tr1}$ to $V_{tr6}$, thereby changing and resetting the secondary transfer voltage in the direction in which the standard deviation decreases. After that, the CPU 72 displays information about the change of the image forming condition of the transfer process on the display unit 90, as needed, in step S209, and executes the processes of steps S201 to S205 again. Note that if, for example, the amount of applied toner changes due to the change of the secondary transfer voltage in step S208, color unevenness may be caused again by the fixing process. For this reason, when the secondary transfer voltage is changed in step S208, the above-described processing concerning the fixing process is desired to be executed again to adjust the fixing temperature.

In step S205, if one of the standard deviations $\sigma_H$ falls within the allowable range, the CPU 72 selects a secondary transfer voltage to be used in subsequent printing from the secondary transfer voltages corresponding to the standard deviations. For example, in FIG. 12, the CPU 72 selects the secondary transfer voltage from $V_{tr2}$ to $V_{tr5}$. If there are a plurality of secondary transfer voltages as choices, the lowest value ($V_{tr2}$ in FIG. 12) is desired to be selected. This is to maintain satisfactory transfer efficiency in both a case in which multicolor toner images are overlaid on the sheet P and a case in which a single-color toner image is formed on the sheet P. That is, a secondary transfer voltage appropriate for a multicolor may be too high for a single color. To cope with both the single color and the multicolor, the secondary transfer voltage is desired to be set as low as possible.

When an appropriate secondary transfer voltage is selected in step S205, the process advances to step S206. In step S206, the CPU 72 may display information about the processing result up to this point on the display unit 90 to notify the serviceman or the user of the information. After that, the processing ends.

As described above, the image forming apparatus according to this embodiment adjusts the image forming condition to reduce color unevenness for a process specified as the cause of the color unevenness. This produces an advantage of appropriately reducing degradation of image quality that occurs due to color unevenness caused by a specific process in addition to the advantage of the first embodiment.

Especially, the image forming apparatus according to this embodiment repetitively adjusts the image forming condition concerning the transfer process until the color unevenness as the cause of a transfer error is reduced to the allowable range, as described above. It is therefore possible to reduce transfer errors even for a recording material having a relatively high resistance value the conventional PYVC control or the like cannot cope with. That is, image quality degradation caused by the transfer process can be reduced independently of the type of recording material.

Other Embodiments

Figure 8:
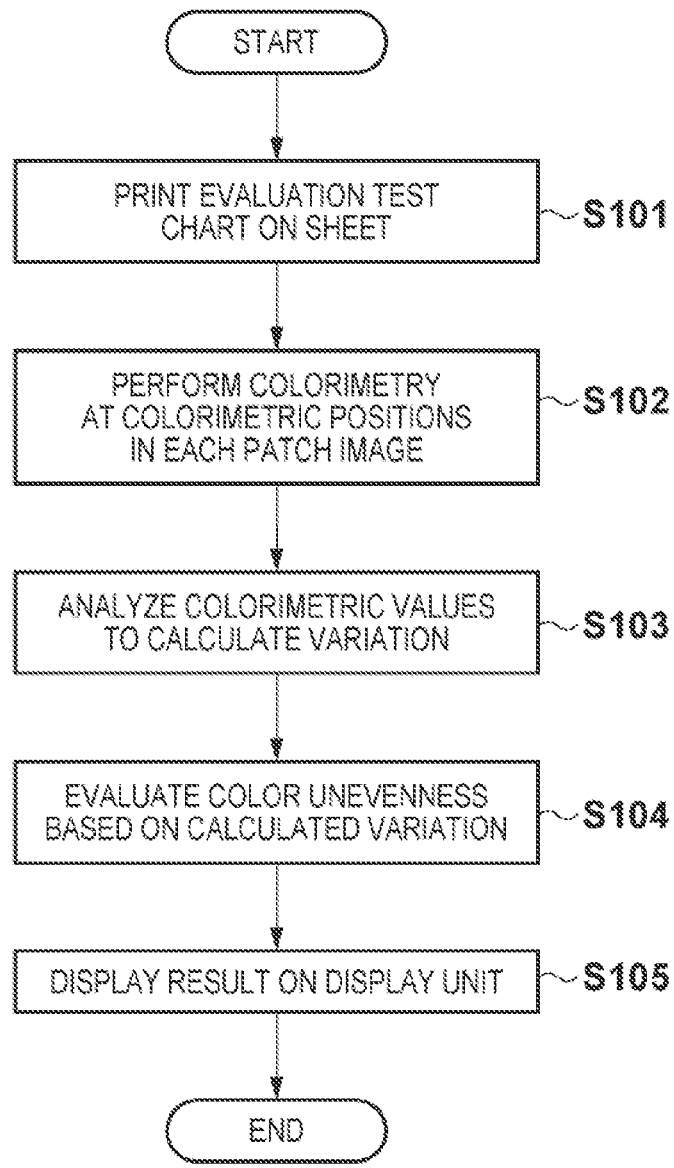
FIG. 8 is a flowchart illustrating the color unevenness evaluation and detection procedure of the image forming apparatus according to the first embodiment.
Figure 9:
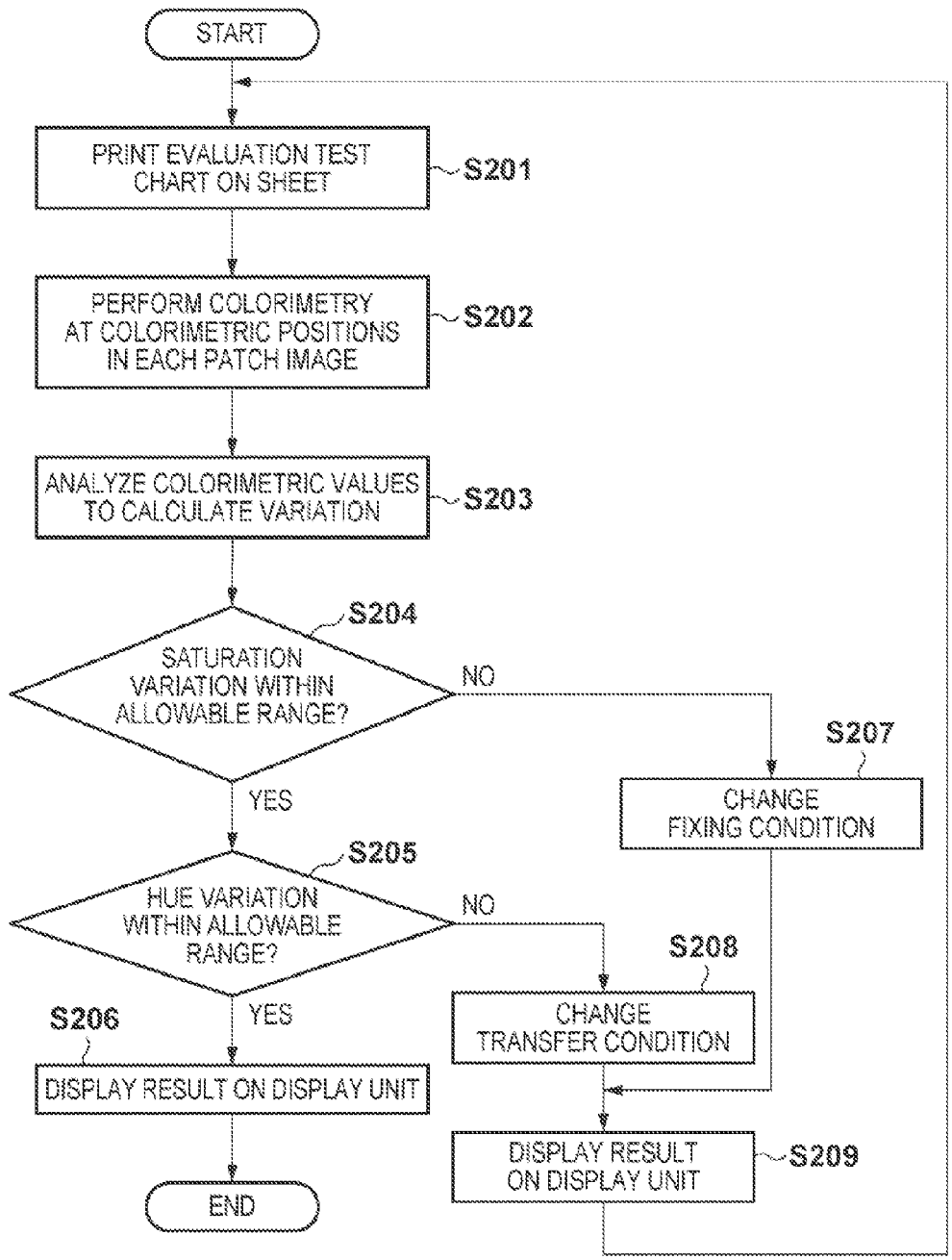
FIG. 9 is a flowchart illustrating the image forming condition adjusting procedure of an image forming apparatus according to the second embodiment.

Part of the processing described in the first and second embodiments with reference to FIGS. 8 and 9 need not always be executed by the image forming apparatus, and can also be executed by an image processing apparatus such as a host computer (host PC) having an image reading (scanner) function. In this case, the image forming apparatus 10 that is the evaluation target of an image defect caused by color unevenness first executes the process of step S101 (S201) to print a color unevenness evaluation test chart (patch images) on the sheet. The host PC detects and evaluates color unevenness caused by a specific process based on image data obtained by reading the patch images printed on the sheet. That is, the host PC executes the processes of steps S102 to S105 (S202 and S203).

More specifically, in step S102 (S202), the host PC reads, using the scanner function, the patch images printed on the sheet by the image forming apparatus 10 to obtain image data. The host PC also executes predetermined image processing to obtain colorimetric values from the image data upon colorimetry of the patch images at a spatial resolution corresponding to the above-described specific process. In step S103 (S203), the host PC calculates a statistic value (for example, standard deviation) based on the second order central moment of a specific color component of the colorimetric values obtained in step S102 (S202). Based on the calculation result, the host PC performs the same processing as that of the image forming apparatus according to the first and second embodiments, thereby detecting that the color unevenness caused by the specific process has occurred in the patch image.

The color unevenness detection result in the host PC is usable to adjust the image forming condition concerning the specific process in the image forming apparatus. That is, data representing the color unevenness detection result in the host PC is provided from the host PC to the image forming apparatus, and the image forming apparatus executes the processes of steps S207 and S208 based on the data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279858, filed Dec. 15, 2010, which is hereby incorporated by reference herein in its entirety.

What is claimed is:

1. An image forming apparatus comprising:
   an image forming unit that forms, on a recording material, a patch image to be used to detect color unevenness by executing an image forming process including a plurality of processes;
   a colorimetry unit that performs colorimetry of the patch image formed on the recording material at a spatial resolution corresponding to a spatial frequency of color unevenness caused by a specific process included in the image forming process, thereby obtaining a colorimetric value;
   a detection unit that detects that the color unevenness caused by the specific process has occurred in the patch image by comparing a statistic value based on an n-th (n is an integer not less than 2) order central moment of a specific color component of the colorimetric value obtained by said colorimetry unit with a reference value; and
   an adjustment unit that, when said detection unit detects that the color unevenness caused by the specific process has occurred in the patch image, adjusts an image forming condition concerning the specific process so as to reduce the color unevenness.

2. The apparatus according to claim 1, wherein
   said colorimetry unit performs colorimetry at a plurality of colorimetric positions in the patch image formed on the recording material at the spatial resolution corresponding to the spatial frequency of the color unevenness caused by the specific process, thereby obtaining a plurality of colorimetric values, and
   said detection unit comprises:
   a calculation unit that calculates, for the specific color component, the statistic value of the plurality of colorimetric values obtained by said colorimetry unit; and
   a determination unit that determines whether the statistic value falls within an allowable range by comparing the statistic value calculated by said calculation unit with the reference value, and
   detects that the color unevenness caused by the specific process has occurred in the patch image when said determination unit determines that the statistic value falls outside the allowable range.

3. The apparatus according to claim 2, wherein said colorimetry unit performs colorimetry at the plurality of colorimetric positions in the patch image formed on the recording material at a spatial resolution higher than the spatial resolution corresponding to the spatial frequency of the color unevenness caused by the specific process to obtain a plurality of colorimetric values, and executes averaging processing for the plurality of colorimetric values of a plurality of adjacent colorimetric positions to obtain a colorimetric value by the spatial resolution corresponding to the spatial frequency of the color unevenness.

4. The apparatus according to claim 1, wherein
   the specific process is a transfer process,
   the spatial resolution of said colorimetry unit is determined by spatial frequency characteristics in which a characteristic value is 0.5 within a spatial frequency range from 1.0 (inclusive) to 8.0 (inclusive) cycles/mm, and said detection unit detects that color unevenness caused by the transfer process has occurred in the patch image based on the statistic value for a hue component of the colorimetric value obtained by said colorimetry unit.

5. The apparatus according to claim 1, wherein the specific process is a fixing process, the spatial resolution of said colorimetry unit is determined by spatial frequency characteristics in which a characteristic value is 0.5 within a spatial frequency range from 0.5 (inclusive) to 4.0 (inclusive) cycles/mm, and said detection unit detects that color unevenness caused by the fixing process has occurred in the patch image based on the statistic value for a saturation component of the colorimetric value obtained by said colorimetry unit.

6. The apparatus according to claim 1, wherein the spatial resolution of said colorimetry unit is a spatial resolution corresponding to a spatial frequency of color unevenness caused by each of a plurality of specific processes included in the image forming process, said detection unit detects that the color unevenness caused by each of the plurality of specific processes has occurred in the patch image by comparing the statistic value of a corresponding color component with the reference value, and said adjustment unit adjusts an image forming condition concerning a process out of the plurality of specific processes, which is a cause of the color unevenness detected by said detection unit.

7. The apparatus according to claim 6, wherein the plurality of specific processes include a transfer process and a fixing process, the spatial resolution of said colorimetry unit is determined by spatial frequency characteristics in which a characteristic value is 0.5 within a spatial frequency range from 1.0 (inclusive) to 4.0 (inclusive) cycles/mm, and said detection unit detects that color unevenness caused by the transfer process has occurred in the patch image based on the statistic value for a hue component of the colorimetric value obtained by said colorimetry unit, and detects that color unevenness caused by the fixing process has occurred in the patch image based on the statistic value for a saturation component.

8. The apparatus according to claim 1, wherein the statistic value is one of a standard deviation and a variance.

* * * * *